US010480866B2

(12) United States Patent
Drolen et al.

(10) Patent No.: US 10,480,866 B2
(45) Date of Patent: Nov. 19, 2019

(54) HEAT PIPE WITH NON-UNIFORM CROSS-SECTION

(71) Applicant: The Boeing Company, Chicago, IL (US)

(72) Inventors: Bruce Lee Drolen, Altadena, CA (US); Douglas H. Van Affelen, Huntington Beach, CA (US); Arun Muley, San Pedro, CA (US); Michael F. Stoia, Rancho Santa Margarita, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/398,790

(22) Filed: Jan. 5, 2017

(65) Prior Publication Data

US 2018/0187979 A1  Jul. 5, 2018

(51) Int. Cl.
*F28D 15/00* (2006.01)
*F28D 15/02* (2006.01)
*F28D 15/04* (2006.01)
*F28F 1/40* (2006.01)
*F28F 1/00* (2006.01)
*F28F 13/08* (2006.01)
*B33Y 80/00* (2015.01)
*F28D 21/00* (2006.01)
*B23P 15/26* (2006.01)

(52) U.S. Cl.
CPC .......... *F28D 15/0266* (2013.01); *B33Y 80/00* (2014.12); *F28D 15/0233* (2013.01); *F28D 15/046* (2013.01); *F28F 1/006* (2013.01); *F28F 1/40* (2013.01); *F28F 13/08* (2013.01); *B23P 15/26* (2013.01); *B23P 2700/09* (2013.01); *F28D 2021/0021* (2013.01); *F28F 2215/04* (2013.01)

(58) Field of Classification Search
CPC ............. F28D 15/0266; F28D 15/0233; F28D 15/046; F28D 2021/0021; F28F 1/006; F28F 1/40; B23P 2700/09
See application file for complete search history.

(56) References Cited

U.S. PATENT DOCUMENTS 3,537,514 A * 11/1970 Levedahl .............. F28D 15/046
                                                137/13
4,116,266 A *  9/1978 Sawata .................. F28D 15/046
                                                122/366
(Continued)

FOREIGN PATENT DOCUMENTS

EP        3252419 A1    6/2017
JP        63183392      7/1988
JP        5618584 B2    11/2014

OTHER PUBLICATIONS

Extended European Search Report, dated May 4, 2018, regarding Application No. 17206431.3, 7 pages.

*Primary Examiner* — Travis C Ruby
(74) *Attorney, Agent, or Firm* — Yee & Associates, P.C.

(57) ABSTRACT

A heat pipe comprises a tube and protrusions. The tube has an internal surface, an external surface, and a length running from a first end to a second end. The protrusions are on the internal surface. A first cross-section of the protrusions at a first location of the length of the tube is different from a second cross-section of the protrusions at a second location of the length of the tube. The tube and the protrusions are monolithic.

17 Claims, 6 Drawing Sheets

(56) References Cited

U.S. PATENT DOCUMENTS

| | | | | |
|---|---|---|---|---|
| 4,489,777 A | * | 12/1984 | Del Bagno | F28D 15/046 165/104.26 |
| 5,010,951 A | * | 4/1991 | Kapolnek | C23F 1/04 122/366 |
| 5,527,588 A | * | 6/1996 | Camarda | B32B 3/20 428/188 |
| 5,725,050 A | * | 3/1998 | Meyer, IV | F28D 15/0266 165/104.33 |
| 5,960,866 A | * | 10/1999 | Kimura | F28D 15/0233 165/104.19 |
| 2015/0237762 A1 | * | 8/2015 | Holt | H05K 7/20336 165/104.21 |

\* cited by examiner

HEAT PIPE WITH NON-UNIFORM CROSS-SECTION

BACKGROUND INFORMATION

1. Field

The present disclosure relates generally to heat pipes, and more specifically, to heat pipes with a non-uniform cross-section. Still more particularly, the present disclosure relates to heat pipes with protrusions having at least one of a tailored spacing, size, or shape.

2. Background

A heat pipe transfers heat between a heat sink and a heat source. A liquid within the heat pipe vaporizes due to heat from the heat source. The vapor travels to the heat sink and condenses into a liquid. The condensed liquid travels back to the heat source through grooves formed by protrusions within the heat pipe.

Today's communication satellites include more than 100 heat pipes per spacecraft. Almost all of these heat pipes are aluminum and ammonia heat pipes. Conventionally, the aluminum bodies of the heat pipes are made by extrusion processes. Extruded structures have a uniform cross-section throughout the pipe length.

Extrusion shapes are designed to include internal capillary grooves, an external wall or tube, and in some cases, mounting flanges. The mounting flanges are selectively located for source and sink locations. The mounting flanges are machined following extrusion. By machining the mounting flanges, welds or other joints are not present between the mounting flanges and the external wall. However, the machining process adds additional manufacturing steps and may add undesirable amounts of manufacturing time.

Following extrusion, some heat pipes may remain in substantially straight shapes. However, a significant subset of heat pipes is bent to accommodate source and sink locations.

Some of the heat pipes are bent in a planar geometry. However, the most challenging heat pipes are bent into three-dimensional shapes. In some cases, between three and ten bends are needed to accommodate the geometry. Complex three-dimensional geometries occupy a significant volume and can be hard to integrate.

The length of the heat pipes is increased to accommodate the complex three-dimensional geometry. Increasing the length of a heat pipe decreases the amount of heat the heat pipe is capable of transferring. Increasing the length of a heat pipe also increases the weight of the heat pipe.

Conventionally, to increase heat load of a heat pipe, the cross-sectional area of the heat pipe is increased, leading to a larger, heavier, extrusion. For at least these reasons, lining up flanges for mounting heat pipes can drive significant complexity, length, mass, cost, and loss of heat transport capability. Therefore, it would be desirable to have a method and apparatus that takes into account at least some of the issues discussed above, as well as other possible issues.

SUMMARY

In one illustrative embodiment, a heat pipe is presented. The heat pipe comprises a tube and protrusions. The tube has an internal surface, an external surface, and a length running from a first end to a second end. The protrusions extend along the internal surface in a direction of the length of the tube. At least one of a spacing, size, or shape of the protrusions changes between the first end of the tube and the second end of the tube. The tube and the protrusions are monolithic.

In another illustrative embodiment, a heat pipe is presented. The heat pipe comprises a tube and protrusions. The tube has an internal surface, an external surface, and a length running from a first end to a second end. The protrusions are on the internal surface. A first cross-section of the protrusions at a first location of the length of the tube is different from a second cross-section of the protrusions at a second location of the length of the tube. The tube and the protrusions are monolithic.

In yet another illustrative embodiment, a method of manufacturing a heat pipe is presented. Material is laid down using additive manufacturing to form a heat pipe comprising a tube and protrusions. The tube has an internal surface, an external surface, and a length running from a first end to a second end. The protrusions are on the internal surface. A first cross-section of the protrusions at a first location of the length of the tube is different from a second cross-section of the protrusions at a second location of the length of the tube. The heat pipe is hot isotropic pressed to reduce porosity. The heat pipe is heat treated to increase strength.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that extrusion creates uniform cross-sections within manufacturing tolerances.

As another example, the illustrative embodiments recognize and take into account that the heat transport capacity of a heat pipe is affected by the length of the heat pipe and the design of the grooves of the heat pipe. The illustrative embodiments recognize and take into account that available pressure head may be described as $$\Delta P_c - (\Delta P_g + \Delta P_{ct}) \geq \Delta P_l + \Delta P_v$$

where $\Delta P_c$ is a maximum capillary pressure head, $\Delta P_l$ is a liquid pressure drop, $\Delta P_v$ is a vapor pressure drop, $\Delta P_g$ is a gravity pressure head, $\Delta P_{ct}$ is a centrifugal pressure head. The illustrative embodiments recognize and take into account that the liquid pressure drop dominates in extruded aluminum and ammonia heat pipes. The illustrative embodiments recognize and take into account that a reduced pressure drop at a condenser end of a heat pipe would increase available pressure head. The illustrative embodiments recognize and take into account that bigger grooves at the condenser end of the heat pipe would reduce the pressure drop at the condenser end.

The illustrative embodiments further recognize and take into account that welds or other types of joints may be weaker than a surrounding monolithic material. Material within welds have different material properties than a surrounding bulk material. The illustrative embodiments also recognize that monolithic structures can be manufactured using processes other than machining. For example, the illustrative embodiments recognize and take into account that extrusion, molding, and other manufacturing processes other than machining result in monolithic structures.

Figure 1:
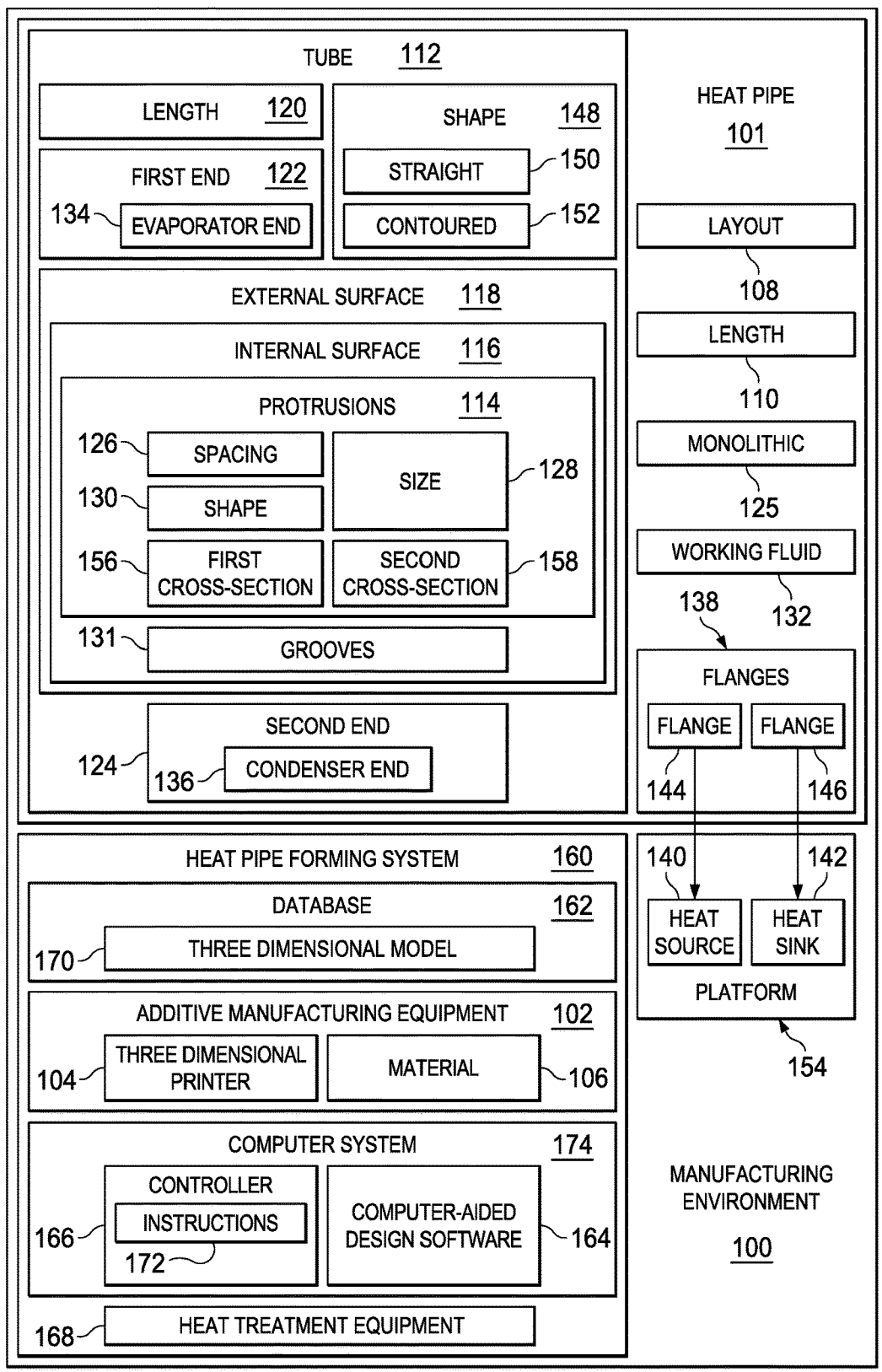
FIG. 1 is an illustration of a block diagram of a manufacturing environment in accordance with an illustrative embodiment.

Referring now to the figures and, in particular, with reference to FIG. 1, an illustration of a block diagram of a manufacturing environment is depicted in accordance with an illustrative embodiment. Manufacturing environment 100 includes equipment to form heat pipe 101. As depicted, manufacturing environment 100 includes additive manufacturing equipment 102.

Heat pipe 101 may be formed using additive manufacturing equipment 102. Conventional machining processes may form structures by shaping or removing material. Additive manufacturing processes form structures by adding material. Specifically, additive manufacturing processes may form structures by adding consecutive layers of material. Additive manufacturing may allow on-demand manufacture of desired parts.

Additive manufacturing equipment 102 may take the form of three-dimensional printer 104 or any other desirable additive manufacturing equipment. In one illustrative example, additive manufacturing equipment 102 may form heat pipe 101 by sequentially forming a plurality of layers. The thickness of each of the plurality of layers may depend on the resolution of additive manufacturing equipment 102. Additive manufacturing equipment 102 may form heat pipe 101 from material 106. Material 106 may take the form of at least one of a metal, a metallic alloy, or other desirable type of material.

As used herein, the phrase "at least one of," when used with a list of items, means different combinations of one or more of the listed items may be used, and only one of each item in the list may be needed. In other words, "at least one of" means any combination of items and number of items may be used from the list but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; or other suitable combinations.

By forming heat pipe 101 using additive manufacturing equipment 102, layout 108 of heat pipe 101 may be closely controlled. By forming heat pipe 101 using additive manufacturing equipment 102, layout 108 of heat pipe 101 does not need to be uniform along length 110 of heat pipe 101.

Heat pipe 101 includes tube 112 and protrusions 114. In some illustrative examples, protrusions 114 may also be referred to as "fins", "lands" or "fin-like structures." Although protrusions 114 may be referred to as "fins," protrusions 114 do not have the primary purpose of conducting heat. Tube 112 has internal surface 116, external surface 118, and length 120 running from first end 122 to second end 124. Protrusions 114 extend along internal surface 116 in a direction of length 120 of tube 112.

Although tube 112 and protrusions 114 are not machined from a single block of material, there are no joints or welds between tube 112 and protrusions 114. Tube 112 and protrusions 114 are monolithic 125. At least one of spacing 126, size 128, or shape 130 of protrusions 114 changes between first end 122 of tube 112 and second end 124 of tube 112.

By changing at least one of spacing 126, size 128, or shape 130 of protrusions 114, protrusions 114 are tailored. By tailoring protrusions 114, functioning of heat pipe 101 is affected. For example, heat transport capacity of heat pipe 101 is affected by tailoring at least one of spacing 126, size 128, or shape 130 of protrusions 114.

In some illustrative examples, a height of at least one protrusion of protrusions 114 changes along length 120 of tube 112. The height of a protrusion is the distance the protrusion extends away from internal surface 116 of tube 112 and towards the center of tube 112. Protrusions 114 may change at least one of spacing 126, size 128, or shape 130 continuously or in a discrete or step-wise manner. In some illustrative examples, protrusions 114 taper from first end 122 to second end 124. In other illustrative examples, at least one protrusion of protrusions 114 terminates prior to second end 124.

Protrusions 114 and internal surface 116 form grooves 131. Grooves 131 transport working fluid 132 within heat pipe 101. Grooves 131 transport working fluid 132 by at least one of capillary action or gravity. In zero-g environments with no spinning forces, capillary forces do all the work to move working fluid 132. In these environments, grooves 131 may be referred to as "capillary grooves." In "reflux" operation, there is a gravity assist.

Working fluid 132 vaporizes at first end 122 and travels to second end 124. Working fluid 132 condenses at second end 124 and travels back to first end 122 using grooves 131. The location, shape, and size of grooves 131 is controlled by controlling spacing 126, size 128, and shape 130 of protrusions 114.

In some illustrative examples, a design of protrusions 114 improves a capillary pumping function of grooves 131 acting upon working fluid 132 within heat pipe 101. In some illustrative examples, first end 122 is evaporator end 134, second end 124 is condenser end 136, and spacing 126 of protrusions 114 at evaporator end 134 is less than spacing 126 of protrusions 114 at condenser end 136.

In some illustrative examples, first end 122 is evaporator end 134 and second end 124 is condenser end 136. In these illustrative examples, a design of protrusions 114 significantly restricts a heat load transferred to the evaporator when heat is applied to condenser end 136.

In some illustrative examples, heat pipe 101 includes flanges 138 extending from external surface 118. In these illustrative examples, tube 112, protrusions 114, and flanges 138 are monolithic. By being monolithic, identifiable joints are not present. Thus, flanges 138 are not welded, or otherwise joined, to tube 112.

In some illustrative examples, flanges 138 are out of plane relative to each other. Flanges 138 are shaped and positioned to interface with heat source 140 and heat sink 142, that are not co-planar with each other. As depicted, flanges 138 includes flange 144 and flange 146. Flange 144 joins heat pipe 101 to heat source 140. Flange 146 joins heat pipe 101 to heat sink 142.

In some illustrative examples, flanges 146 are shaped and positioned to reduce length 110 of heat pipe 101. Reducing length 110 of heat pipe 101 increases heat transport capacity of heat pipe 101. In some illustrative examples, heat pipe 101 provides a shortest three-dimensional path from heat source 140 to heat sink 142.

Tube 112 has shape 148. In some of these examples, tube 112 is substantially straight 150. When tube 112 is substantially straight 150, length 110 of heat pipe 101 may be minimized. In other illustrative examples, tube 112 is contoured 152. Tube 112 may be contoured 152 to take into account geometries of components of platform 154 having heat source 140 and heat sink 142.

Platform 154 may take any desirable form. Although the illustrative examples for an illustrative embodiment are described with respect to a satellite, an illustrative embodiment may be applied to other types of platforms. Platform 154 may be, for example, a mobile platform, a stationary platform, a land-based structure, an aquatic-based structure, or a space-based structure. More specifically, platform 154 may be a surface ship, a tank, a personnel carrier, a train, a spacecraft, a space station, a satellite, a submarine, an automobile, a manufacturing facility, a building, or other suitable types of platforms. Further, platform 154 may be a small-scale or handheld device such as a cell phone, tablet, computer, or other suitable type of platform.

In some illustrative examples, heat pipe 101 comprises tube 112 and protrusions 114. Tube 112 has internal surface 116, external surface 118, and length 120 running from first end 122 to second end 124. Protrusions 114 are on internal surface 116. First cross-section 156 of protrusions 114 at a first location of length 120 of tube 112 is different from second cross-section 158 of protrusions 114 at a second location of length 120 of tube 112, and tube 112 and protrusions 114 are monolithic 125.

In some illustrative examples, a height of at least one protrusion of protrusions 114 changes along length 120 of tube 112. In some illustrative examples, at least one protrusion of protrusions 114 terminates prior to second end 124. In some illustrative examples, protrusions 114 form grooves 131, in which grooves 131 are a plurality of continuously variable grooves.

Additive manufacturing equipment 102 may be a part of heat pipe forming system 160. Heat pipe forming system 160 may also include database 162, computer-aided design software 164, controller 166, and heat treatment equipment 168.

Heat treatment equipment 168 includes any desirable equipment to modify the material characteristics of material 106 of heat pipe 101 after material 106 is laid down by additive manufacturing equipment 102. For example, heat treatment equipment 168 may include a number of furnaces, autoclaves, or other equipment to perform hot isotropic pressing, tempering, or any other desirable heat treatment processes.

As depicted, additive manufacturing equipment 102, such as three-dimensional printer 104, may be used to form heat pipe 101 based on three-dimensional model 170 stored in database 162. In this illustrative example, database 162 may be a storage device configured to store models, such as three-dimensional model 170.

In some illustrative examples, three-dimensional model 170 may be used to form heat pipe 101. In some illustrative examples, three-dimensional model 170 may be a data file used to generate instructions 172 to form heat pipe 101. In some illustrative examples, three-dimensional model 170 may be a data file formed using data regarding platform 154. For example, three-dimensional model 170 may take into account a desirable amount of heat transfer between heat source 140 and heat sink 142, a location of heat source 140 within platform 154, a location of heat sink 142 within platform 154, secondary structures of platform 154, or any other characteristics of platform 154.

As illustrated, controller 166 may be a device configured to generate instructions 172 for additive manufacturing equipment 102 based on three-dimensional model 170 such that additive manufacturing equipment 102 forms heat pipe 101 in a desired manner. In this illustrative example, controller 166 may be implemented in software, hardware, firmware, or a combination thereof. When software is used, the operations performed by controller 166 may be implemented using, for example, without limitation, program code configured to run on a processor unit. When firmware is used, the operations performed by controller 166 may be implemented using, for example, without limitation, program code and data, and is stored in persistent memory to run on a processor unit.

When hardware is employed, the hardware may include one or more circuits that operate to perform the operations performed by controller 166. Depending on the implementation, the hardware may take the form of a circuit system, an integrated circuit, an application-specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations, processes or both, performed by controller 166 may be performed using organic components integrated with inorganic components. In some cases, the operations, processes, or both may be performed by entirely of organic components, excluding a human being. As one illustrative example, circuits in organic semiconductors may be used to perform these operations, processes, or both. In this illustrative example, controller 166 may be implemented in computer system 174. In other illustrative examples, controller 166 may be remote to computer system 174.

As depicted, instructions 172 may be commands executable by additive manufacturing equipment 102. Controller 166 may generate instructions 172 in a format usable for additive manufacturing equipment 102. Instructions 172 may then be sent to additive manufacturing equipment 102 so that additive manufacturing equipment 102 may form heat pipe 101 from material 106. Instructions 172 may be sent to additive manufacturing equipment 102 via wireless communications links, wired communications links, another suitable type of communications medium, or a combination thereof.

The illustration of manufacturing environment 100, and more specifically, of heat pipe 101 and heat pipe forming system 160 and the components within heat pipe forming system 160 in FIG. 1, is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, material 106 need not be a single material. In some illustrative examples, material 106 may be more than one material.

Figure 2:
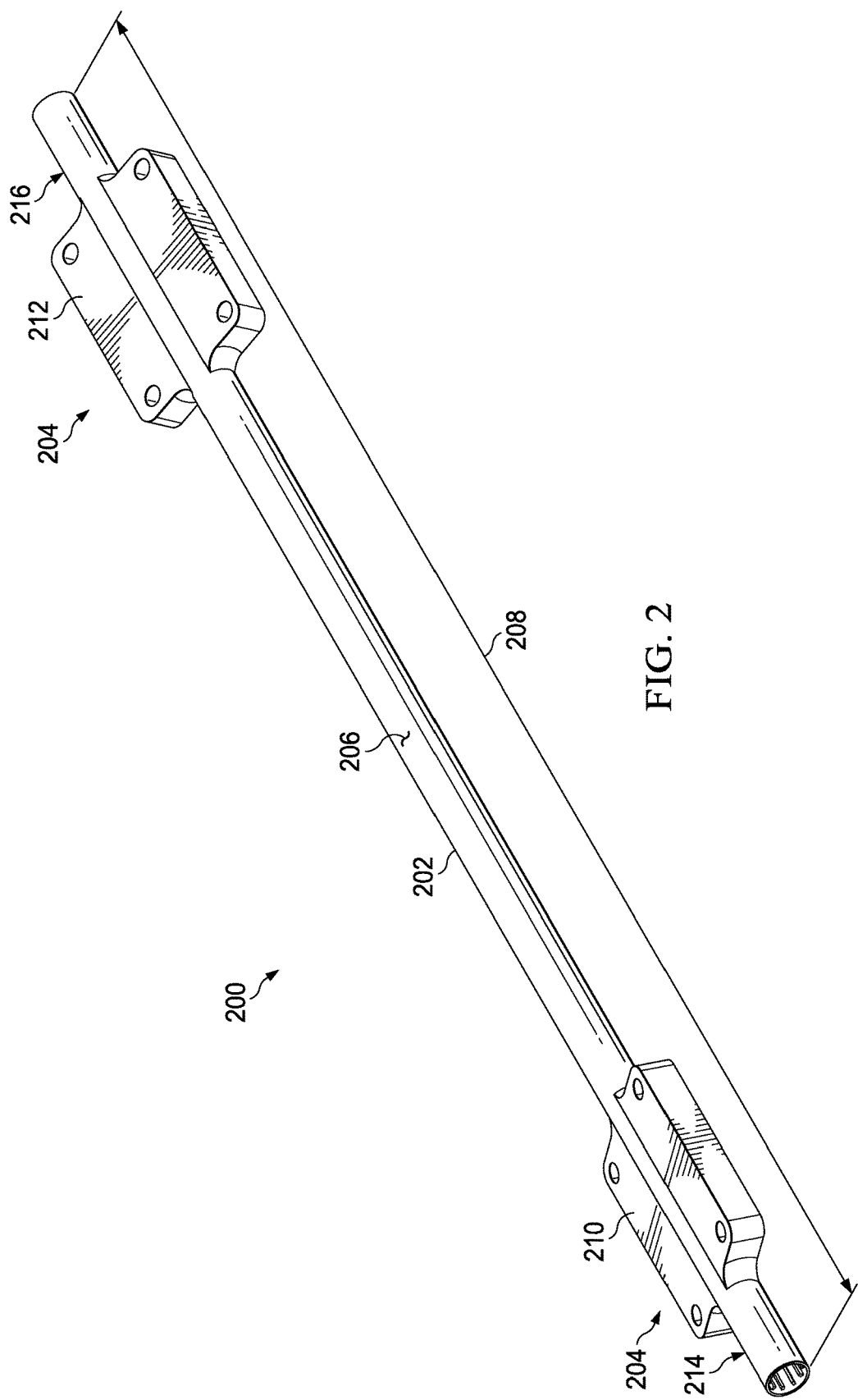
FIG. 2 is an illustration of an isometric view of a heat pipe with a non-uniform cross-section in accordance with an illustrative embodiment.

Turning now to FIG. 2, an illustration of an isometric view of a heat pipe with a non-uniform cross-section is depicted in accordance with an illustrative embodiment. Heat pipe 200 is a physical implementation of heat pipe 101 of FIG. 1. Heat pipe 200 includes tube 202 and flanges 204 extending from external surface 206 of tube 202. Tube 202 and flanges 204 are monolithic.

As depicted, tube 202 is substantially straight and has length 208. As depicted, flange 210 and flange 212 of flanges 204 are out of plane relative to each other, wherein the flanges are shaped and positioned to interface with a heat source and a heat sink that are not co-planar with each other.

As depicted, flanges 204 are shaped and positioned to reduce length 208 of heat pipe 200. Heat pipe 200 may have at least a length long enough to transfer heat from a heat source and a heat sink. Length 208 is sufficient to connect heat pipe 200 to the heat source and the heat sink. For example, first end 214 may be connected to a condenser of a platform and second end 216 may be connected to an evaporator of a platform.

Figure 3:
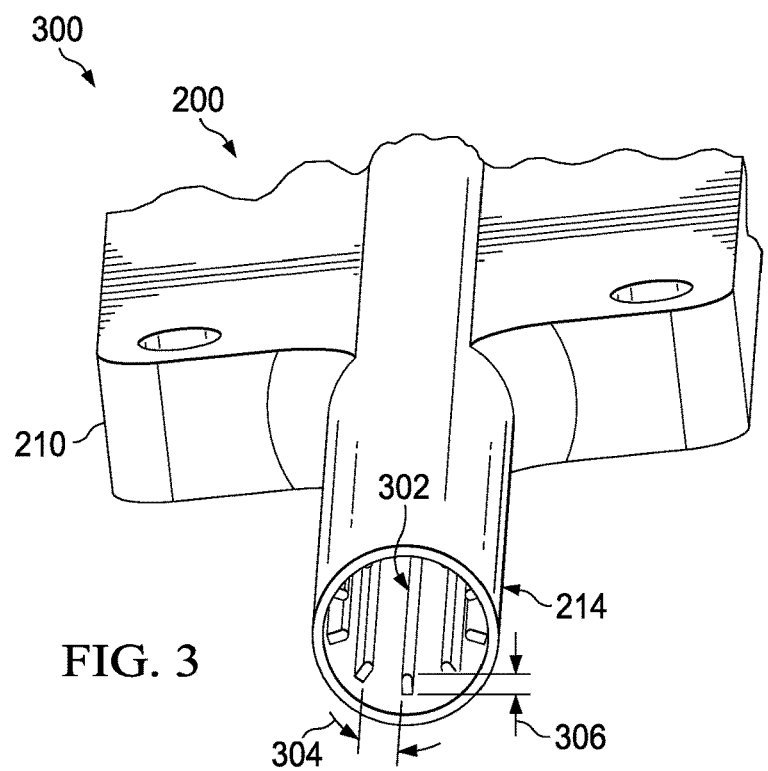
FIG. 3 is an illustration of an isometric view of a first end of a heat pipe with a non-uniform cross-section in accordance with an illustrative embodiment.

Turning now to FIG. 3, an illustration of an isometric view of a first end of a heat pipe with a non-uniform cross-section is depicted in accordance with an illustrative embodiment. View 300 is a view of first end 214 of tube 202 of FIG. 2. When installed, first end 214 may be attached to a condenser of a platform. First end 214 may be called a "condenser end".

As depicted, first end 214 has protrusions 302 visible. Protrusions 302 have spacing 304 and height 306 at first end 214. Protrusions 302 run into the page with length 208 of heat pipe 200 shown in FIG. 2. Some of protrusions 302 may not extend the whole of length 208 of heat pipe 200. In some illustrative examples, at least one protrusion of protrusions 302 changes at least one of shape or size.

Figure 4:
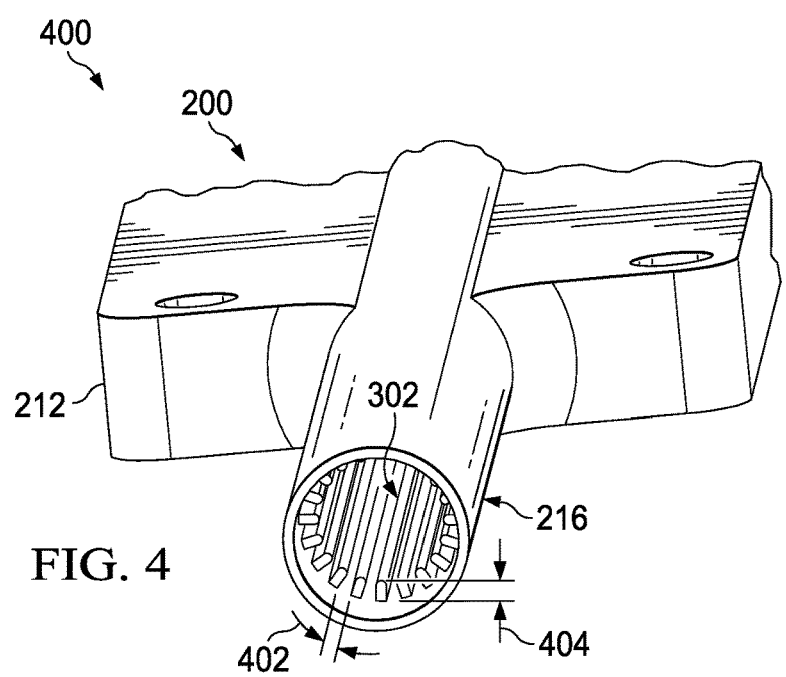
FIG. 4 is an illustration of an isometric view of a second end of a heat pipe with a non-uniform cross-section in accordance with an illustrative embodiment.

Turning now to FIG. 4, an illustration of an isometric view of a second end of a heat pipe with a non-uniform cross-section is depicted in accordance with an illustrative embodiment. View 400 is a view of second end 216 of tube 202 of FIG. 2. When installed, second end 216 may be attached to an evaporator of a platform. Second end 216 may be called evaporator end.

As depicted, second end 216 has protrusions 302 visible. Protrusions 302 have spacing 402 and height 404 at second end 216. Protrusions 302 run into the page with length 208 of heat pipe 200. Some of protrusions 302 may not extend the whole of length 208 of heat pipe 200. In some illustrative examples, at least one protrusion of protrusions 302 changes at least one of shape or size.

As depicted, spacing 402 is less than spacing 304 of FIG. 3. Spacing 402 is less than spacing 304 because additional protrusions are present at second end 216 that are not present at first end 214. In this illustrative example, height 404 of protrusions at second end 216 is substantially the same as height 306 of protrusions at first end 214.

As can be seen in FIGS. 3 and 4, cross-section at first end 214 is not the same as the cross-section at second end 216. Thus, the cross-section of heat pipe 200 is non-uniform and cannot be directly manufactured using extrusion.

Figure 5:
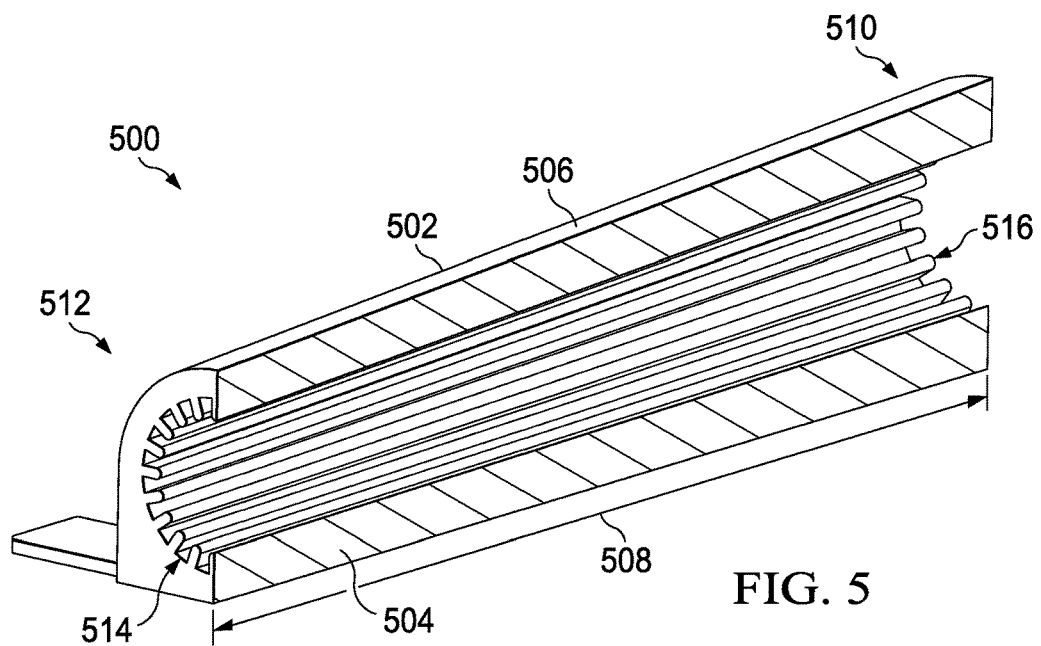
FIG. 5 is an illustration of a cross-sectional view of a heat pipe with a non-uniform cross-section in accordance with an illustrative embodiment.

Turning now to FIG. 5, an illustration of a cross-sectional view of a heat pipe with a non-uniform cross-section is depicted in accordance with an illustrative embodiment. Heat pipe 500 is a physical implementation of heat pipe 101 of FIG. 1. Heat pipe 500 may be a physical implementation of the inside of heat pipe 200 of FIG. 2.

As depicted, and for simplicity of depiction only, heat pipe 500 does not have multiple flanges in FIG. 5. However, heat pipe 500 may desirably have any number, position, or shape of flange to connect to a heat source and a heat sink.

As depicted, heat pipe 500 has tube 502 having internal surface 504, external surface 506, and length 508 running from first end 510 to second end 512. Protrusions 514 are monolithic with tube 502. Protrusions 514 extend along internal surface 504 in a direction of length 508 of tube 502. As depicted, each of protrusions 514 extends from first end 510 to second end 512.

As depicted, each of protrusions 514 decreases in height from second end 512 to first end 510. Decreasing the height of protrusions 514 creates a non-uniform cross-section for heat pipe 500. The shape of protrusions 514 affects thermal resistance of heat pipe 500.

Grooves 516 are formed by protrusions 514 and internal surface 504. By changing the height of protrusions 514, the shape of grooves 516 changes from first end 510 to second end 512. Tailoring grooves 516 may increase transport capacity of heat pipe 500. By tailoring grooves 516 to a desired shape along length 508, transport capacity may be increased by twice or more. By tailoring grooves 516, smaller heat pipe 500 sizes may result. Decreasing size of heat pipe 500 includes reducing at least one of length 508 or the diameter of heat pipe 500. By decreasing the size of heat pipe 500, the weight of heat pipe 500 is also reduced.

Figure 6:
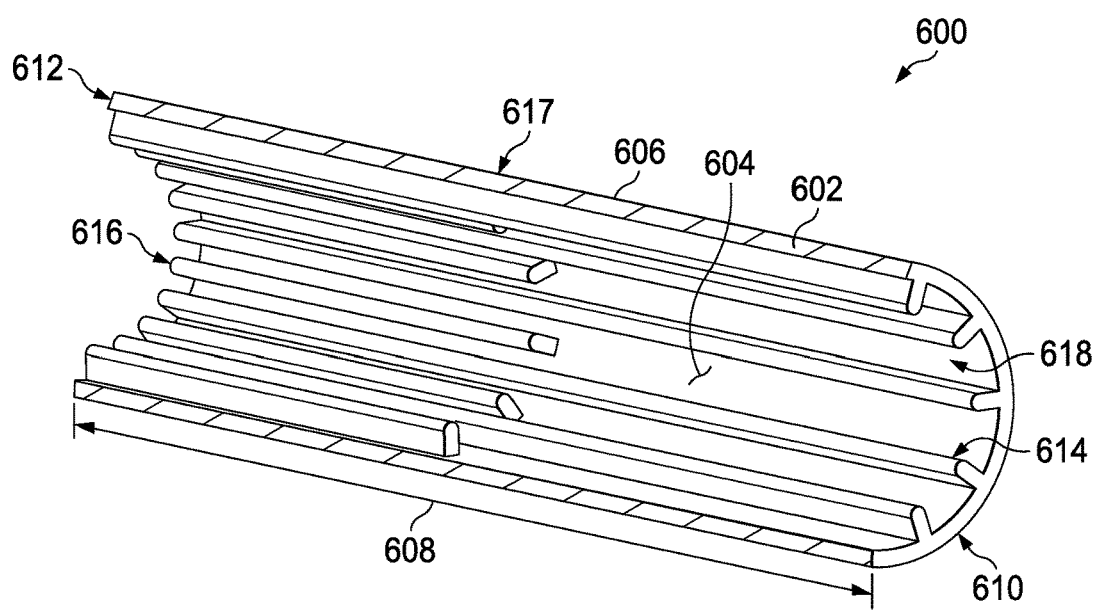
FIG. 6 is an illustration of a cross-sectional view of a heat pipe with a non-uniform cross-section in accordance with an illustrative embodiment.

Turning now to FIG. 6, an illustration of a cross-sectional view of a heat pipe with a non-uniform cross-section is depicted in accordance with an illustrative embodiment. Heat pipe 600 is a physical implementation of heat pipe 101 of FIG. 1. Heat pipe 600 may be a physical implementation of the inside of heat pipe 200 of FIG. 2.

As depicted, and for simplicity of depiction only, heat pipe 600 does not have multiple flanges in FIG. 6. However, heat pipe 600 may desirably have any number, position, or shape of flange to connect to a heat source and a heat sink.

As depicted, heat pipe 600 has tube 602 having internal surface 604, external surface 606, and length 608 running from first end 610 to second end 612. Protrusions 614 are monolithic with tube 602. Protrusions 614 extend along internal surface 604 in a direction of length 608 of tube 602. As depicted, some of protrusions 614 do not fully extend from second end 612 to first end 610. Thus, a quantity of protrusions 614 is reduced from second end 612 to first end 610.

As depicted, first set 616 of protrusions 614 extend from second end 612 towards first end 610 and terminates at location 617. Terminating first set 616 of protrusions 614 prior to first end 610 creates a non-uniform cross-section for heat pipe 600.

Grooves 618 are formed by protrusions 614 and internal surface 604. By reducing the quantity of protrusions 614 from first end 610 to second end 612, the shape of grooves 618 changes from first end 610 to second end 612. Tailoring grooves 618 may increase transport capacity of heat pipe 600. By tailoring grooves 618 to a desired shape along length 608, transport capacity may be increased by twice or more. By tailoring grooves 618, smaller heat pipe sizes may result.

Figure 7:
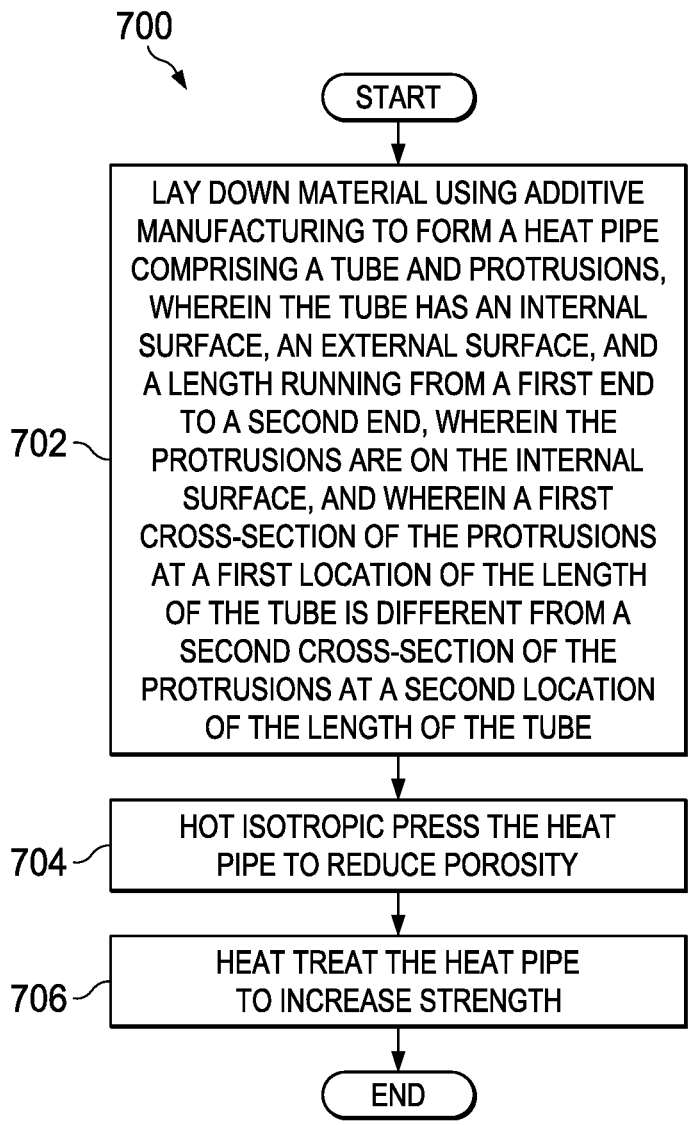
FIG. 7 is an illustration of a flowchart of a method of manufacturing a heat pipe in accordance with an illustrative embodiment.

Turning now to FIG. 7, an illustration of a flowchart of a method of manufacturing a heat pipe is depicted in accordance with an illustrative embodiment. Method 700 may be used to form heat pipe 101 of FIG. 1. Method 700 may be used to form any of heat pipe 200, heat pipe 500, or heat pipe 600 in FIGS. 2, 5 and 6, respectively.

Method 700 lays down material using additive manufacturing to form a heat pipe comprising a tube and protrusions, wherein the tube has an internal surface, an external surface, and a length running from a first end to a second end, wherein the protrusions are on the internal surface, and wherein a first cross-section of the protrusions at a first location of the length of the tube is different from a second cross-section of the protrusions at a second location of the length of the tube (operation 702). Method 700 hot isotropic presses the heat pipe to reduce porosity and increase strength (operation 704). Method 700 heat treats the heat pipe to increase strength (operation 706). Afterwards, the process terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in method 700, laying down the material using additive manufacturing may further comprise forming flanges extending from the external surface, wherein the flanges are at arbitrary angles with respect to each other. As another example, in method 700, the tube is contoured to produce a shortest path from a heat source to a heat sink of a platform, taking into account surrounding structures of the platform.

Figure 8:
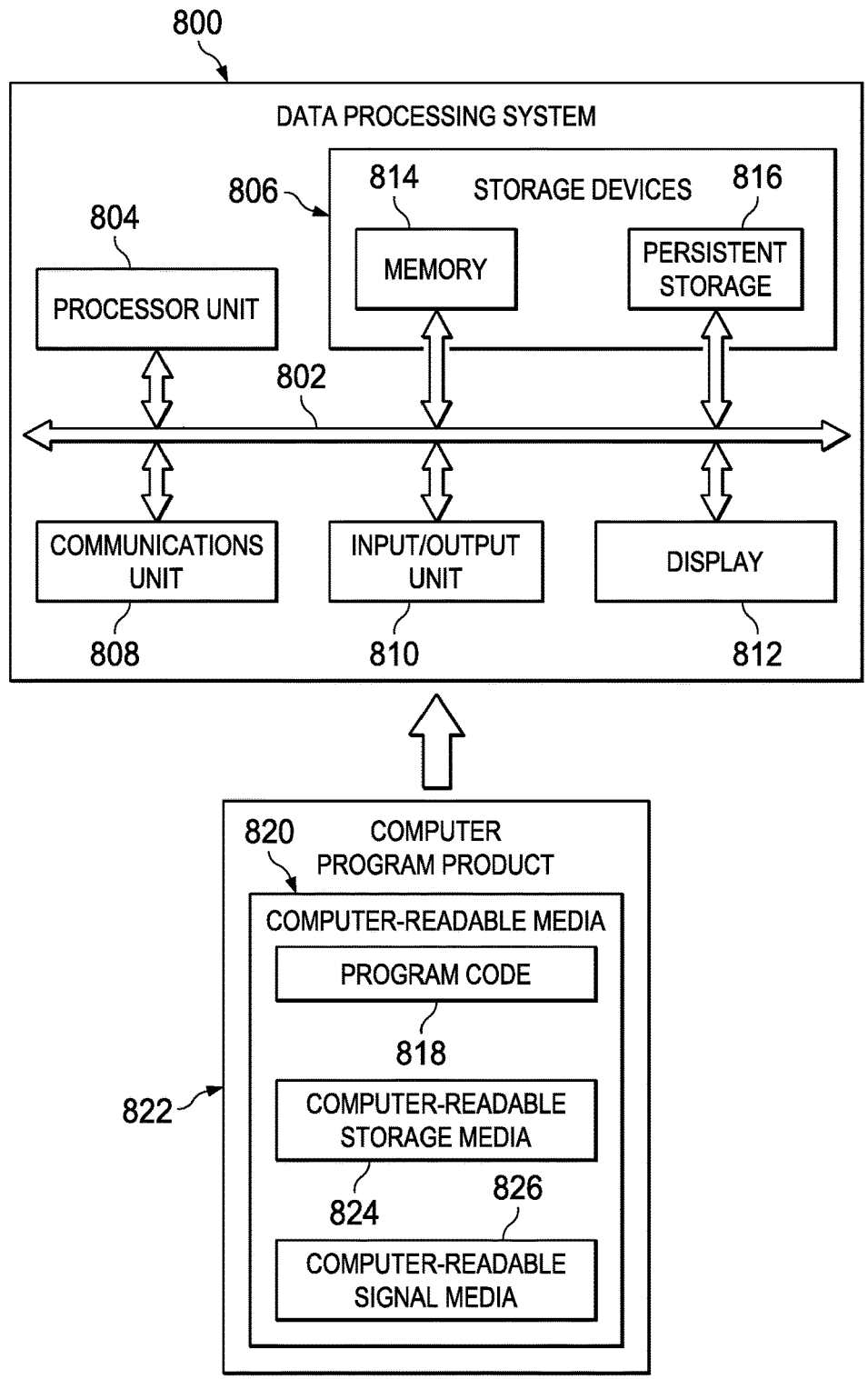
FIG. 8 is an illustration of a data processing system in the form of a block diagram in accordance with an illustrative embodiment

Turning now to FIG. 8, an illustration of a data processing system in the form of a block diagram is depicted in accordance with an illustrative embodiment. Data processing system 800 may be used to implement computer system 174 of FIG. 1. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other suitable type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer-readable storage device, is any piece of hardware capable of storing information on a temporary and/or permanent basis. This information may include, but is not limited to, data, a program code, and/or other information.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory drive, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from, and output to be sent to other devices connected to data processing system 800. For example, input/output unit 810 may allow user input to be received through a keyboard, a mouse, and/or some other type of input device. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as a program code, a computer-usable program code, or a computer-readable program code, and may be read and executed by one or more processors in processor unit 804.

In these examples, program code 818 is located in a functional form on computer-readable media 820, which is selectively removable, and may be loaded onto or transferred to data processing system 800 for execution by processor unit 804. Program code 818 and computer-readable media 820 together form computer program product 822. In this illustrative example, computer-readable media 820 may be computer-readable storage media 824 or computer-readable signal media 826.

Computer-readable storage media 824 is a physical or tangible storage device used to store program code 818, rather than a medium that propagates or transmits program code 818. Computer-readable storage media 824 may be, for example, without limitation, an optical or magnetic disk, or a persistent storage device that is connected to data processing system 800.

Alternatively, program code 818 may be transferred to data processing system 800 using computer-readable signal media 826. Computer-readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The illustrative embodiments provide a method and apparatus for forming a heat pipe having a non-uniform cross-section. More specifically, the illustrative embodiments provide a method and apparatus for forming a heat pipe having tailored grooves for heat transportation of a platform.

Additive machining allows reduced pressure drops at the condenser end by using bigger grooves where pumping is not as challenged. Groove shape may be optimized to provide the desired pumping. In one example, groove shape changes in multiple steps along the passage. In another example, groove shape changes in a continuous manner rather than a step-wise manner.

Today's heat pipes use internally-grooved capillary wall structure manufactured by extrusion. The geometric cross section of these pipes, including flanges, is uniform throughout the length. These illustrative examples use additive machining to create the wall structure. This approach allows for tailoring of the shape and number of grooves along the length, yielding improved heat transport. Heat pipe contour can then be shaped to yield the shortest three-dimensional path from source to sink. External flanges required to interface with the heat source and heat sink are added with the optimum shape and location to allow for the shortest path with the easiest installation.

Transporting heat efficiently from the heat source to heat sink within spacecraft and other platforms in geometries where the heat source and the heat sink transfer surfaces are at random compound angles relative to each other, i.e. not aligned, in plane or orthogonal to each other.

With today's extruded heat pipes, operators may be faced with imposing seven or eight bends along the length of a heat pipe to get the uniform extruded flanges to line up with the heat input and output (source and sink) surfaces. This makes the heat pipes expensive to manufacture, longer, less capable of moving heat (due to the length) and heavier. These heat pipes are also very difficult to design, leading to expensive development efforts. These three-dimensional bent heat pipes also occupy significant volume and are thus restrictive to other spacecraft hardware and difficult to integrate. With uniform groove shape along the length of today's extruded heat pipes, a designer balances the desire to make the grooves small to provide high capillary pumping with the goal to promote easy flow of the liquid from the condenser to the evaporator to reduce pressure drops. This balance inevitably leads to a compromise position, with the grooves small enough to pump as much fluid as possible, through grooves big enough to let the fluid pass through. With additive manufacturing, the groove dimensions can be tailored along the heat pipe length to provide two times or more increase in the heat transport capability of the heat pipe.

With additive machining, the heat pipe can be designed to take the shortest or most convenient path from the heat source to heat sink with flanges optimally-shaped to conform to the heat transfer surfaces of the heat source and heat sink. Similarly, the internal groove structure of the heat pipe can be optimized along the length of the heat pipe to provide the maximum pumping head at the evaporator (smallest grooves) and the minimum viscous pressure drop in the transport and condenser ends of the heat pipe. Additive manufacturing would also allow heat pipes of non-cylindrical shape to be manufactured with flatter cross-sections to better promote heat transfer from flat heat input and output surfaces, thus reducing the temperature differences in the metal flanges of today's heat pipes. Flatter heat pipes are less capable of reacting the internal pressure and resultant forces within the heat pipe and are more likely to deform or bow out under this pressure. Flatter configurations may include strengthening features either internally or externally to support the flatter external walls. For example, stiffeners or braces may be present to support flatter external walls.

Tailoring grooves for a heat pipe allows the heat pipe to take shortest or most convenient path from the heat source to heat sink. The heat pipes of the illustrative examples may have an increased heat load capacity. Further, the heat pipes of the illustrative examples may also have reduced mass. Tailoring grooves for a heat pipe may result in a less complex shape for the heat pipe. A less complex heat pipe is easier to integrate in a platform.

The illustrative examples do not need to bend the heat pipe, resulting in one less step in the process. The illustrative examples may have the flanges independently positioned on circumference where needed. Flanges with optimum shape include features to reduce thermal resistance. For example, a gusset may be positioned to improve conduction heat flow between the heat pipe and the flange.

Tailored heat pipes may result in fewer and/or smaller heat pipes. Tailored heat pipes may result in reduced mass and cost.

Groove structures can be tailored along the length of the heat pipe. Partial thermal diode effect can be built in for resiliency. An end cap of the heat pipe can be included to reduce the number of parts and operations.

Roughness may result from additive manufacturing. Roughness in a heat pipe may reduce $Q \times L_{\it eff}$, which may lead to boiling. However, the roughness is good for reflux. Roughness in the heat pipe due to additive manufacturing may be reduced by heat treatments, such as hot isotopic processing.

The illustrative examples provide a method and apparatus for a heat pipe in which the internal fins change either density, or height (or both) as they extend down the inside of the tube so the cross-sectional area of the wicking material changed through the length of the tube. These illustrative examples improve the pumping function.

One illustrative example of the heat pipe will have variable capillary wall structures. In some illustrative examples, the heat pipe has continuously variable capillary wall structures where the fins taper across the heat pipe cross section.

The apparatus for grooved heat pipe having a variable cross section produced is produced using additive machining. This structural form cannot be produced out of axially grooved extruded heat pipes.

The design allows tailoring of the shape and number of grooves along the length yielding improved heat transport. This variable cross section allows customization for the heat transfer needs.

The heat pipe contour can be shaped to yield the shortest three-dimensional path from heat source to heat sink. External flanges used to interface with the heat source and heat sink are added with the optimum shape and location to allow for the shortest path with the easiest installation. This allows much shorter heat pipes to be designed. Further, applying flanges at offset angles allows the heat pipe to move heat from two arbitrarily oriented locations without manufacturing impacts due to bending heat pipes.

The design permits a greater density of grooves near the evaporator versus the condenser. This greater density of grooves near the evaporator enables heat pipes to transport more heat.

Moving heat efficiently from heat source to heat sink is difficult within spacecraft and other platforms in geometries where the source and sink heat transfer surfaces are at random angles relative to each other.

One of the features of the illustrative examples is the ability of additive machining to deliver structural forms that cannot be formed for axially grooved extruded heat pipes. Some examples of the heat pipe have the internal fins that change either density, or height (or both) as they extend down the inside of the tube so the cross-sectional area changes along heat pipe. Three-dimensional printing provides features, such as the ability to apply flanges in the position and shape desired. This ability to apply flanges allows much shorter heat pipes.

The complex three-dimensional shape of a conventional heat pipe described is forced by the need to bend the extrusion (not twist) to get the flanges to line up with the heat sink and heat source locations. The concept of additive manufacturing allows this to be done with a much shorter, more capable, lighter additive manufactured heat pipe. Other advantages can be gained by changing the groove structure as the grooves progress from the evaporator to the condenser.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A heat pipe comprising:
   a tube having an internal surface, an external surface, and a length running from a first end to a second end;
   a first planar flange located proximal to the first end relative to the second end, wherein a central axis for the tube is positioned between a plane of a first surface of the first planar flange and a plane of a second surface of the first planar flange, wherein the first surface and the second surface of the first planar flange extend from the external surface;
   a second planar flange located proximal to the second end relative to the first end, wherein the central axis is positioned between a plane of a third surface of the second planar flange and a plane of a fourth surface of the second planar flange, wherein the third surface and the fourth surface of the second planar flange extend from the external surface, and wherein the second planar flange is out of plane with the first planar flange; and
   protrusions continuously extending along the internal surface in a direction of the length of the tube, wherein at least one of a spacing, a size, or a shape of the protrusions changes continuously along the length between the first end of the tube and the second end of the tube, wherein the tube and the protrusions are monolithic.

2. The heat pipe of claim 1, wherein a height of at least one protrusion of the protrusions changes along the length of the tube.

3. The heat pipe of claim 1, wherein at least one protrusion of the protrusions terminates prior to the second end.

4. The heat pipe of claim 1, wherein the first end is an evaporator end, wherein the second end is a condenser end, and wherein a spacing of protrusions at the evaporator end is less than a spacing of protrusions at the condenser end.

5. The heat pipe of claim 1, wherein the protrusions taper from the first end to the second end.

6. The heat pipe of claim 1, wherein the tube, the protrusions, and the first planar flange and the second planar flange are monolithic.

7. The heat pipe of claim 6, wherein the first planar flange and the second planar flange are shaped and positioned to interface with a heat source and a heat sink that are not co-planar with each other.

8. The heat pipe of claim 7, wherein the first planar flange and the second planar flange are shaped and positioned to reduce the length of the tube.

9. The heat pipe of claim 1, wherein the tube is contoured to produce a shortest path from a heat source to a heat sink of a platform taking into account surrounding structures of the platform.

10. The heat pipe of claim 1, wherein the first end is an evaporator end, wherein the second end is a condenser end, and wherein a design of the protrusions restricts a heat load transferred to an evaporator when heat is applied to the condenser end.

11. A heat pipe comprising:
    a tube having an internal surface, an external surface, and a length running from a first end to a second end;
    a first planar flange located proximal to the first end relative to the second end, wherein a central axis for the tube is positioned between a plane of a first surface of the first planar flange and a plane of a second surface of the first planar flange, wherein the first surface and the second surface of the first planar flange extend from the external surface;
    a second planar flange located proximal to the second end relative to the first end, wherein the central axis is positioned between a plane of a third surface of the second planar flange and a plane of a fourth surface of the second planar flange, wherein the third surface and the fourth surface of the second planar flange extend from the external surface, and wherein the second planar flange is out of plane with the first planar flange; and
    continuously variable protrusions on the internal surface, wherein the tube has a non-uniform cross-section such that a first cross-section of the protrusions at a first location of the length of the tube is different from a second cross-section of the protrusions at a second location of the length of the tube, and wherein the tube and the protrusions are monolithic.

12. The heat pipe of claim 11, wherein a height of at least one protrusion of the protrusions changes along the length of the tube.

13. The heat pipe of claim 11, wherein at least one protrusion of the protrusions terminates prior to the second end.

14. The heat pipe of claim 11, wherein the heat pipe provides a shortest three-dimensional path from a heat source to a heat sink.

15. The heat pipe of claim 11, wherein the protrusions form a plurality of continuously variable grooves.

16. A method comprising:
  laying down material using additive manufacturing to form a heat pipe comprising a tube and protrusions, wherein the tube has an internal surface, an external surface, a length running from a first end to a second end, a first planar flange located proximal to the first end relative to the second end, a second planar flange located proximal to the second end relative to the first end, wherein the protrusions are continuously formed on the internal surface and form a plurality of continuously variable grooves, and wherein a first cross-section of the protrusions at a first location of the length of the tube is different from a second cross-section of the protrusions at a second location of the length of the tube;
  hot isotropic pressing the heat pipe to reduce porosity; and
  heat treating the heat pipe to increase strength.

17. The method of claim 16, wherein the tube is contoured to produce a shortest path from a heat source to a heat sink of a platform taking into account surrounding structures of the platform.

* * * * *